United States Patent [19]
Basso et al.

[11] Patent Number: 5,724,348
[45] Date of Patent: Mar. 3, 1998

[54] EFFICIENT HARDWARE/SOFTWARE INTERFACE FOR A DATA SWITCH

[75] Inventors: Claude Basso, Nice; Jean Calvignac, La Gaude; Mathieu Girard, Saint Laurent du Var; Daniel Orsatti, Cagnes Sur Mer; Michel Susini, Saint Laurent du Var; Fabrice Verplanken, La Gaude, all of France

[73] Assignee: International Business Machines Corporation, Armonk, N.Y.

[21] Appl. No.: 858,156

[22] Filed: May 5, 1997

Related U.S. Application Data

[63] Continuation-in-part of Ser. No. 547,825, Oct. 25, 1995, abandoned.

[30] Foreign Application Priority Data

Apr. 5, 1995 [EP] European Pat. Off. ............... 95480039

[51] Int. Cl.[6] .................................................. H04L 12/56
[52] U.S. Cl. ........................ 370/384; 370/398; 370/422
[58] Field of Search ................................. 370/355, 357, 370/360, 384, 386, 389, 395, 398, 419, 422, 522; 395/200.02, 200.12, 200.15, 200.2

[56] References Cited

U.S. PATENT DOCUMENTS

| 4,821,259 | 4/1989 | DeBruler et al. | 370/60 |
| 5,315,588 | 5/1994 | Kajiwara et al. | 370/60.1 |
| 5,430,720 | 7/1995 | Larsson et al. | 370/60 |
| 5,539,884 | 7/1996 | Robrok, II | 370/60 |

Primary Examiner—Alpus H. Hsu

[57] ABSTRACT

A data switch is described with a multi-port data switching element, one or more input/output adapters for receiving user data cells from outside the switch and for transmitting cells switched through the switching element to a network outside the switch, and a control element including a control processor. To reduce the complexity of the data switch, the single control processor is used to control operations of hardware modules on both the the control element on which the processor is located and on the input/output adapters. The control is provided by means of control cells which generally traverse the same data paths as user data cells and generally conform to the format of user data cells, at least within the data switch. Both the control processor and the hardware modules are capable of generating control cells and transmitting them toward a target, either the control processor or hardware modules.

2 Claims, 8 Drawing Sheets

EFFICIENT HARDWARE/SOFTWARE INTERFACE FOR A DATA SWITCH

The application is a continuation of application Ser. No. 08/547,825, filed Oct. 25, 1995, now abandoned.

CROSS REFERENCE TO RELATED APPLICATIONS

The present invention is related to the below-listed applications filed on the same date as this application and commonly assigned to the assignee of this invention: Ser. No. 08/548,029, filed Oct. 25, 1995 and entitled "Method for Using an IP Address-Based Routing Protocol in an ATM Environment"; Ser. No. 08/548,030, filed Oct. 25, 1995 and entitled "ATM Cell Multicasting Method and Apparatus"; Ser. No. 08/547,826, filed Oct. 25, 1995 and entitled "ATM Cell Forwarding and Label Swapping Method and Apparatus"; and Ser. No. 08/547,828 filed Nov. 1, 1995 and entitled "Method and Apparatus for Priority Level Queuing in Processing ATM Cell Header and Payload".

FIELD OF THE INVENTION

The present invention relates to data communications in general and more particularly to an efficient hardware/software interface for a data switching device, such as an ATM (Asynchronous Transfer Mode) switch.

BACKGROUND OF THE INVENTION

FIG. 1 is a high level block diagram of a typical ATM switch. A switching fabric 100 capable of switching data packets from any to any of its switch input/outs is connected to a control element 151 through leads 111 and 113 and to an adapter 102 through leads 103 and 105. There could be several other adapters, such as adapters 104 and 106, similar or identical to adapter 102. Each adapter is connected to the switching fabric through a pair of input/output leads, such as leads 101. The number of adapters which can be connected to the switching fabric is limited only by the number of available input/output leads.

Control element 151 controls the ATM switch, using a control processor 150, which may be a microprocessor. The control processor is connected to a DMA controller 152, which in turn is connected to a send buffer system 154 and a receive buffer system 156. The primary function of the DMA controller 152 is to control the transfer of data between the buffer systems 152 and 154 and the control processor 150. The buffer system 152 is connected an ATM layer processing system 158. The buffer system 154 is similarly connected to a second ATM layer processing system 160. The ATM layer processing systems perform normal ATM layer handling for ATM cells being switched through the switching fabric 100 between the switch's input and output ports 100. Control memories 162, 164, 166 and 168 are used for storing control programs for the send buffer system 154, the ATM layer processing system 158, the receive buffer system 156 and the ATM layer processing system 160, respectively.

The organization of adapter 102 is similar to the organization of the control element 151. Adapter 102 includes a first buffer system 112 for queueing data to be sent to the switching fabric 100, an associated ATM layer handling processor 116 and control memories 114 and 118 for the systems 112 and 116 respectively. The adapter further includes a second buffer system 122 for queueing data received from the switching fabric, an associated ATM layer handling processor 126 and control memories 124 and 128.

The adapter 102 also includes a multiplexer circuit 110 for multiplexing ATM cells received on a set 130 of parallel input ports P1 through P4 onto a single input bus 132. To accommodate different media that might be connected to the input ports, a set 136 of Physical Media Dependent (PMD) interface chips are interposed between the input ports and the multiplexer 110. The adapter further includes a demultiplexer 120 for demultiplexing or distributing ATM cells received on a single output bus 134 among ports in a set 131 of parallel output ports. The demultiplexer 120 is connected through a second set 137 of PMD interface chips which condition the outgoing data for the particular media attached to the output ports in set 131.

The described implementation of an ATM switch is intended to be illustrative only. Other implementations are possible, such as a system in which the control element and adapters are physically integrated onto the same or a few number of boards. Similarly, the switching fabric might be replaced by a bus or the functions might be allocated differently among the elements.

For further details on ATM concepts and techniques, reference may be had to the below-listed publications:

J. Y. LeBoudec, "The Asynchronous Transfer Mode: A tutorial", Comp Networks ISDN, 24, pp. 279–309, May 15, 1992.

The ATM Forum, "UNI Specification", Version 3.0, Prentice Hall, ISBN 0-13-225863-3, September 1993, and Version 3.1, September 1994.

The ATM Forum, "Interim Inter-Switch Signalling Protocol (IISP)", Draft 94-0924R2, November 1994.

The ATM Forum, "P-NNI Draft Specification", Draft 94-0471R3, 1994.

In systems of the type shown in FIG. 1, it is either necessary or desirable to implement certain functions, such as system hardware initialization, system management, set-up and release of connections, record keeping, error reporting and the like. In prior art systems, the implementation generally requires that a processor be located on at least each adapter. One of the processors runs the networking software and is identified as the master processor while other processors control an interface to the adapter hardware or handle exchanges of control information with the master. Typically, the exchanges of control information are accomplished by using the user data flow paths but only with unique data units conforming to a specific protocol while the hardware interface is based on interrupt mechanisms and MMI/O operations. Usually, a specific hardware module is connected to the processor bus and serves as a mailbox for other hardware modules that are not directly connected to the processor.

FIG. 4 illustrates such a system. The system has two adapters 451 and 402, having processors 450 and 460, respectively. Hardware control is realized by means of MMI/Os and interrupt operations in each adapter, while processor-to-processor communication is achieved by using DMA transfer between the processor and the hardware 455 and 465, and the user data flow for the hardware-to-hardware transfer through switch 400, by leads 468 and 470. In this system, processor 450 is the master and processor 460 acts as a interface, translating information received through the DMA 465 into MMI/O operations on bus 463.

SUMMARY OF THE INVENTION

The present invention makes use of a single control processor to control the entire system. The invention consists in establishing bidirectional logical connections between the control processor and any hardware module on any adapter using control cells which circulate through the system from the control processor to the various hardware modules and from the hardware modules back to the control processor. Where the hardware modules generate the control cells, the cells can be circulated to the control processor using the ordinary user data flow.

The control processor can thus communicate with any hardware module of the system the same way it communicates with workstations attached to switch ports. From the control processor's perspective, each hardware module can be seen as an ATM workstation attached to the system. This logical view is illustrated in FIG. 3, which represents a communication system with three adapters or blades, control element 151 and high speed blades 102 and 104. Control processor 150 and a hardware module 300 are shown communicating through logical path 301. This bidirectional communication is permanent and is supported by the same hardware as required for switched communication between a user at port P4 on blade 102 and a user at port P4 on blade 104. Permanent communication means that the control processor 150 does not need to install a connection control block in the hardware in contrast to switched communications, which require that connection control blocks be supplied to hardware routing tables at call set-up time.

FIG. 5 is a simplified view of the centralized control processor structure and shows that the hardware interface for a high speed blade 102 is controlled by the centralized control processor 150 of control unit 151.

Specific hardware mechanisms imbedded in the different modules allow the circulation of control cells and the processing of commands embedded in the control cells. Cell switching from blade to blade requires adding information to received ATM cells to identify the connection to which the cell belongs as well as routing information to be used by the switching resource. In accordance with the invention, this overhead is used to encode two intermixed logical flows: the user data flow and the control cell flow. The two types of flows are distinguished by adding, in an overhead part of the cell, a cell type indicator. In addition, a connection ID is reserved (and hence not used by the control processor 150 to install a user connection) and dedicated to the two ATM control cell flows: control cells generated by control processor 150 and control cells generated by hardware modules. The cell type indicator and the dedicated connection ID are redundant but allow minimization of hardware mechanisms since any module can identify a cell as a control cell or a user data cell using normall cell processing.

BRIEF DESCRIPTION OF THE DRAWINGS

Details of a preferred embodiment of the invention are provided in the following description which should be read in conjunction with the accompanying drawings wherein.

DESCRIPTION OF PREFERRED EMBODIMENT

Figure 1:
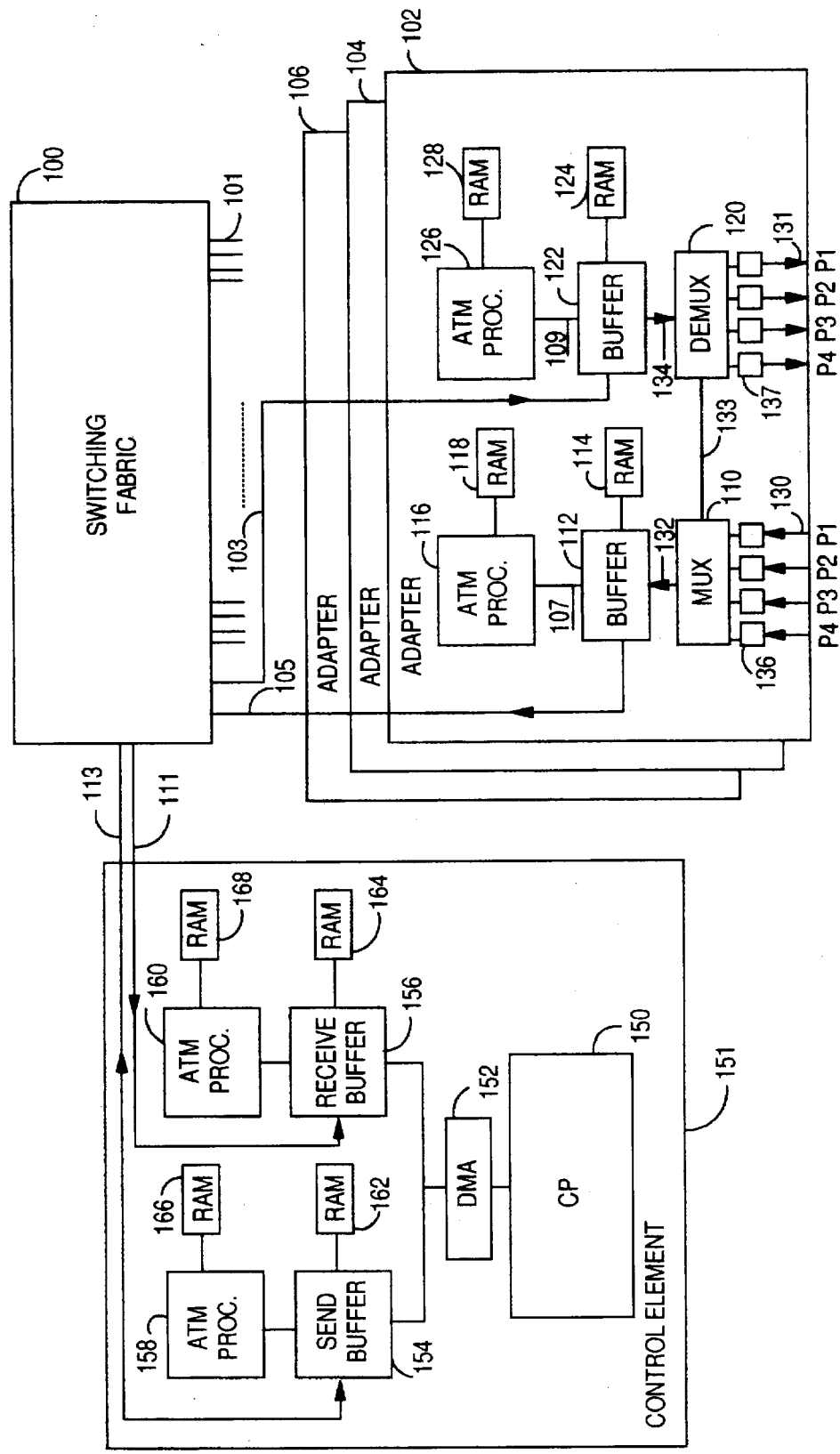
FIG. 1 is a block diagram of an ATM switch showing the environment for the present invention.
Figure 2:
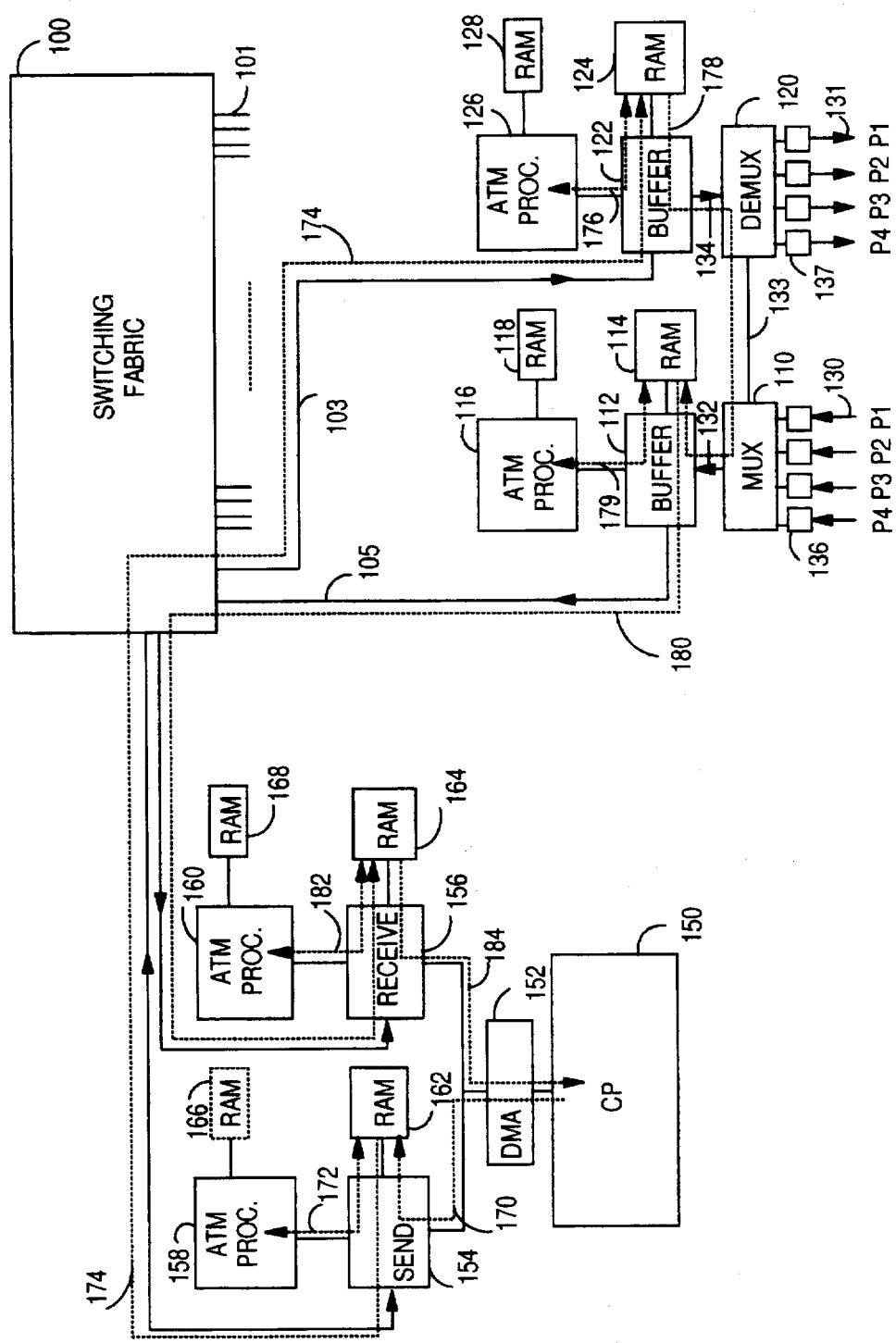
FIG. 2 shows the circulation flow of a control cell.
Figure 3:
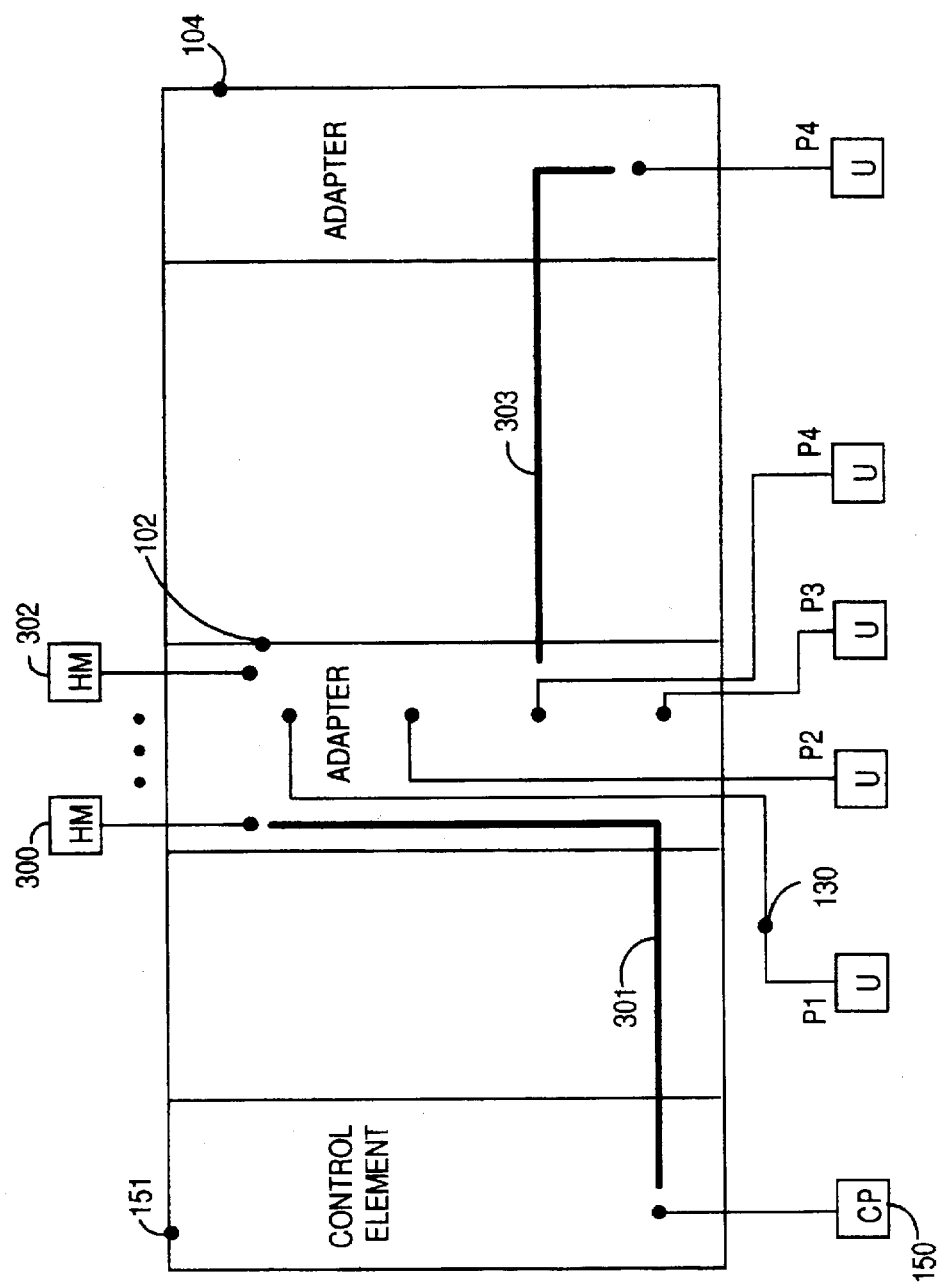
FIG. 3 illustrates the analogy between the software-to-hardware module communication, with the user-to-user communication.
Figure 4:
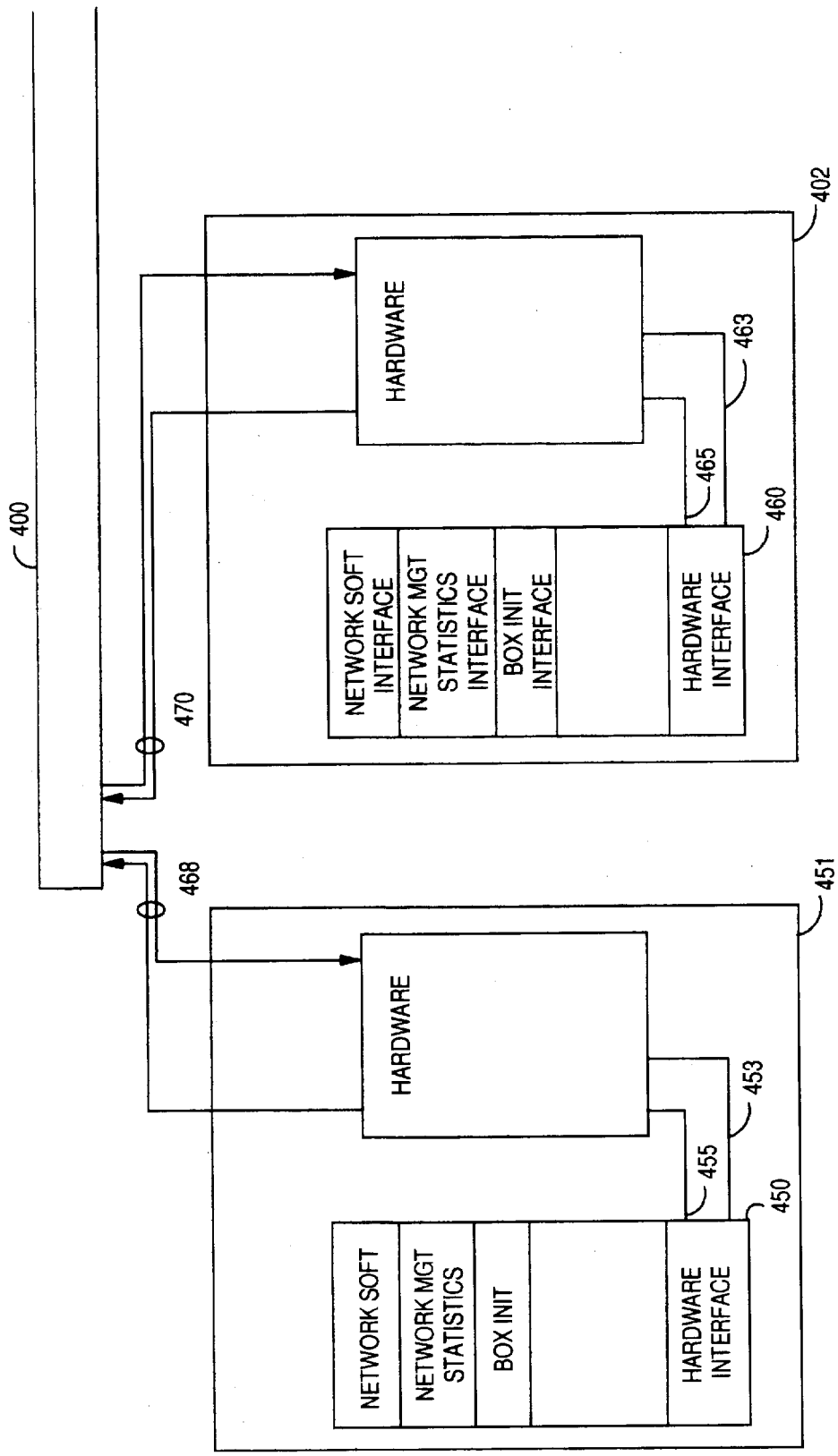
FIG. 4 represents a known hardware/software interface in a communication system.

The following description covers a preferred implementation of the invention in the context of the hardware elements shown in both FIGS. 1 and 2. Notwithstanding that FIG. 1 is labelled as representing the prior art and that the present invention is described in the context of FIG. 1, it should be understood that the illustrated hardware elements, while performing the general functions already described, cannot perform the invention without the modifications and additions described below. In other words and as an example, even though this document may refer to "multiplexer 110" in both the prior art description and in the description of the present invention, the prior art "multiplexer 110" is not the same element as "multiplexer 110" as implemented in accordance with the present invention. It should be assumed, in the following description, that any referenced element is being described as it would be implemented in accordance with the present invention, and not in accordance with the prior art.

The primary functions of multiplexer 110 are: to multiplex data from a plurality of input ports onto the single input bus 132; to count good cells, cells with HEC errors and invalid cells; and to perform HEC (Header Error Correction) operations. The multiplexer 110 is composed of: four physical ATM ports Macros (200); a Cell Transmit Scheduler 202 used to control the actual multiplexing of cell traffic onto the bus 132 and a shared RAM counter 204 used to count ATM cells.

Figure 5:
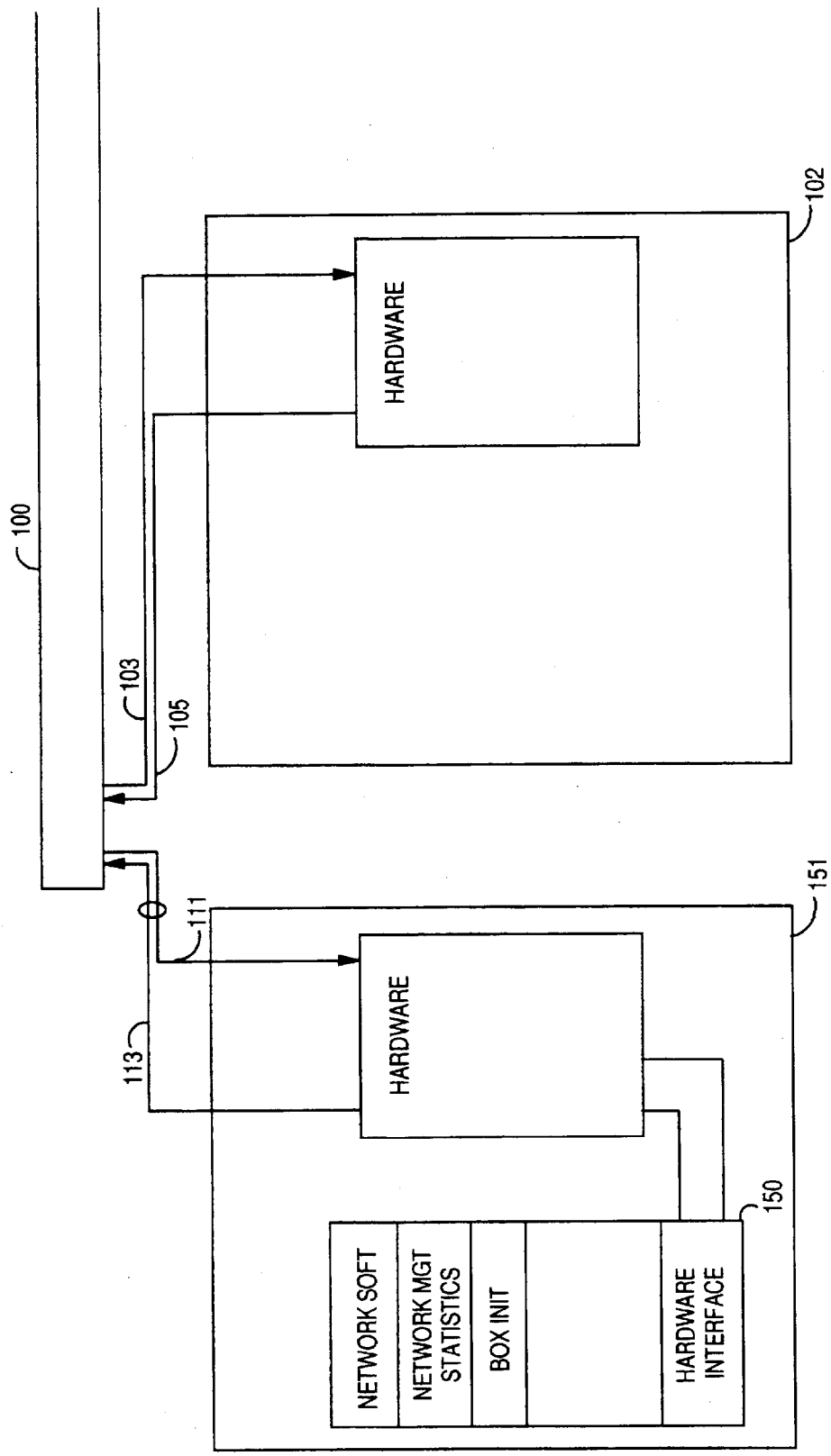
FIG. 5 shows the hardware/software interface according to the present invention.

The data flow can be summarized as follows. ATM cells are received from interface chips 136, at media speed. Each cell is delivered with a START OF CELL signal decoded from the TT command. Bad cells (i.e., void cells, cells with HEC errors and invalid cells) are filtered and discarded. Valid cells from all of the ports are multiplexed onto the input bus 132. As shown in FIG. 5, the input bus 132 carries the following signals. CLK 1320 is a clock signal. All signals are synchronized in the middle of two consecutive rising edges of this signal. Bus 212 is the Data Bus up. On the input interface, the signals 212 form the data path from the multiplexer 110 to the buffers 112. VALIDW 1322 is a control bit which validates the contents of the data path. If VALIDW=0, no word is transferred on the data path. If VALIDW=1, a word is transferred on the data path. LASTW 1323 is a control bit that flags the current last data word of the cells. INHIBIT 1324 is a control bit set by the buffer system 112 to indicate that the following cycle must not be used. Finally, PORTNUMB 1325 is a four bit control word that identifies the source port for the current data word.

FIG. 2 shows the circulation of control cells through the entire ATM switch. Each control cell is circulated throughout at least two adapters, control element 151, and adapter 102, adapter 104 or adapter 106. A control cell is directed to one or more hardware modules on at least one of said adapters. The circulation is described in terms of paths followed by the control cells. The associated processing of the control cells is described later.

Path 170: A control cell is transmitted from control processor 150 to buffer system 152 by an ordinary DMA transfer, and then transferred from buffer system 152 to ATM layer processing system 154, and stored in control memory 162.

Path 172: The control cell is manipulated and processed between ATM layer processing system 158, ATM layer processing system 154 and control memory 162.

Path 174: ATM layer processing system 154 transmits the control cell, to switching fabric 100 which directs it to the appropriate input/output leads 101. The control cell is received in buffer system 122 and stored in control memory 124.

Path 176: The control cell is manipulated and processed between ATM layer processing system 126, buffer system 122, and control memory 124.

Path 178: The control cell is transmitted from control memory 124 to demultiplexer 120 through output bus 134. The control cell is forwarded through demultiplexer 120 to multiplexer 110 through adapter bus 133, to buffer system 112 on input bus 132 and then stored in control memory 114.

Path 179: The control cell is manipulated and processed between ATM layer processing system 116, buffer system 112, and control memory 114.

Path 180: Buffer system 112 transmits the control cell to switching fabric 100, which directs it to the appropriate input/output leads 101. The control cell is received in buffer system 156 and stored in control memory 164.

Path 182: The control cell is manipulated and processed between ATM layer processing system 160, buffer system 156, and control memory 164.

Path 184: The control cell is transmitted from control memory 164 through buffer system 152 to control processor 150 through the DMA interface 152.

By sending control cells on these paths, control processor 150 is able to read and/or write registers in, and to send commands to, all hardware modules in the entire system. Control cells associated to these operation are characterized as read, write or command control cells. In one embodiment of the invention, control cells do not make a round-trip throughout the system, but are discarded at the hardware module to which they are directed. This can be true only for write and/or command control cells. In an alternate embodiment of the invention, the hardware modules themselves generate control cells to be sent to control processor 150.

In accordance with established standards, ATM cells are fixed-length packets of fifty-three bytes, consisting of a five header bytes, one of which is an HEC byte plus forty-eight data bytes. When an ATM cell is present at input ports 130, error checking is performed and the HEC byte is removed. Thus, the ATM cell actually stored in control memory 114 contains fifty-two bytes. Eight bytes of "overhead" data is added, leading to a sixty byte internal cell format (or fifteen words of four bytes). The overhead data contains: a routing field used by switching fabric 100 to direct the cell to the appropriate input/output leads 101, a connection control block identifier, and a cell type field, which can identify either of two types of cells in the preferred embodiment: user data cells received at the User-to-Network Interface (UNI) from an attached workstation, or control cells; i.e., internal system cells used as explained earlier to carry read, write or command instructions to hardware modules throughout the system.

Figure 8:
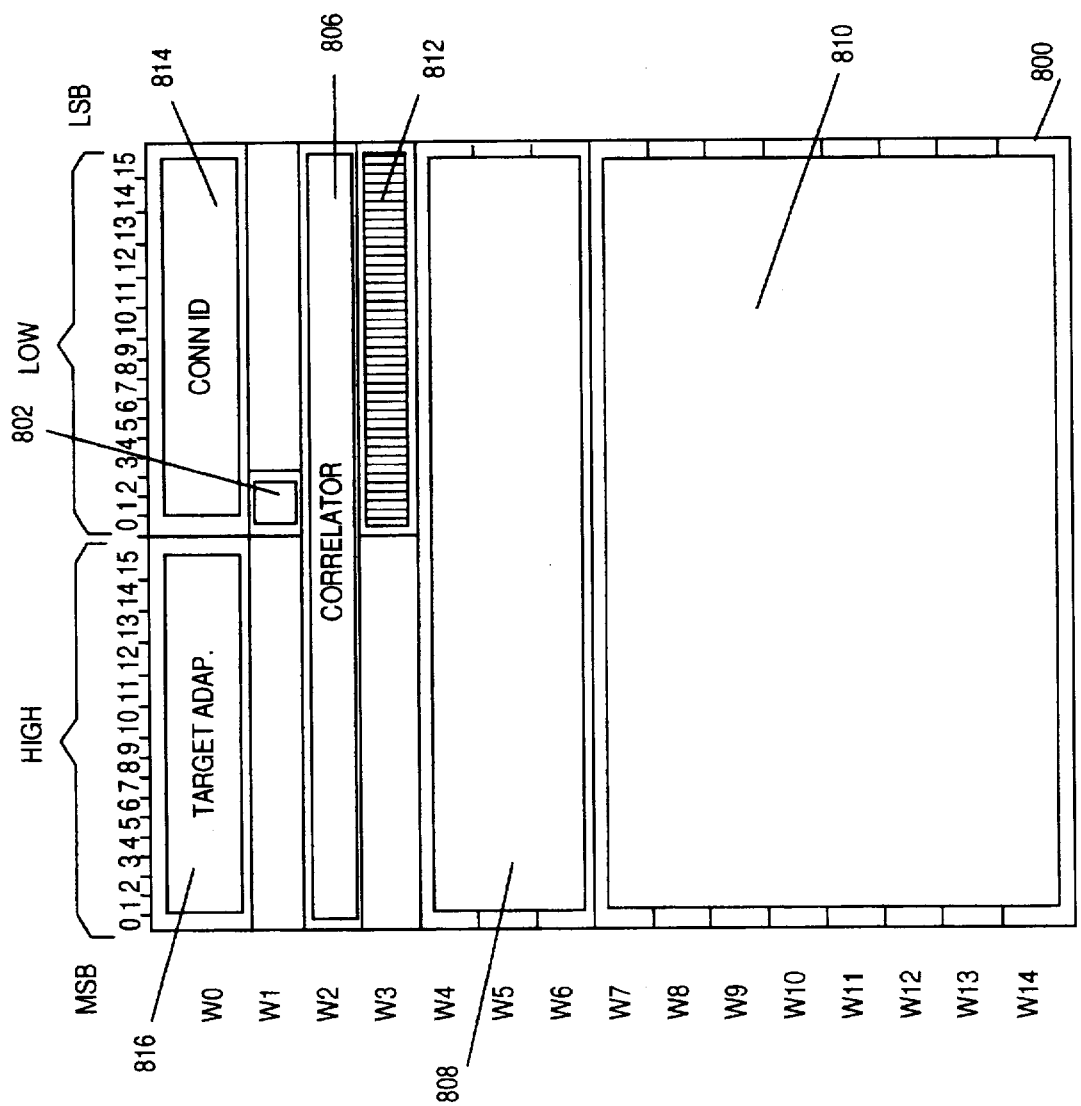
FIG. 8 is a general view of a control cell.

The following is a general description of a control cell. Referring to FIG. 8, like any other stored cell, a stored control cell. is fifteen words (W0 to W14), with each word being four bytes in width. For comparison, a regular user data ATM cell received at the UNI interface, is also stored as fifteen four-byte words, with W0-W1 corresponding to the overhead internal to the communication system, W2 corresponding to the ATM cell header (less the HEC), and W3-W14 corresponding to ATM data payload. As far as the overhead, it is sufficient to say that target adapter field 816 in W0 High halfword includes identification of the target adapter or blade (TB). It is well known that to perform a table look-up using the header in the incoming ATM cell in order to identify the target blade.

A control cell is identified by both a cell type field 802 equal to '100' and by a connection identification field 814 (LCBA) equal to '000h'. LCBA=000h is necessarily a reserved value which is never used by control processor 150 to set up a user connection. This redundant identification of a control cell is done so that all hardware modules are able to identify that a particular cell in the data flow is a control cell. The control cell also includes target adapter field 816 with the TB identification. At W2, the control cell contains a correlator field 806 used to perform end-to-end processing by control processor 150. At W3, the control cell contains a command type field 812 which defines the nature of the control cell and the module for which it is targeted. Command type field 812 is a sixteen bit field (W3 Low halfword) with the following bit meanings:

a) Bit 15=1 means the control cell works in the up direction (from input ports 130 to switching fabric 100).
b) Bit 14=1 means the control cell works in the down direction (from switching fabric 100 to output ports 131).
c) Bit 13=1 means the control cell is intended for a controller module, such as DMA transfer controller 152, multiplexer 110 or demultiplexer 120.
d) Bit 12=1 means the control cell is intended for a buffer system module.
e) Bit 11=1 means the control cell is intended for a ATM layer processing module.
f) Bit 10=1 identifies a read control cell. while bit 10=0 identifies a write control cell.
g) Bit 9=1 means the control cell is intended for control element 151. while bit 9=0 means the control cell is intended for one of the adapters 102, 104, 106, etc.
h) Bit 8=1 means bits 0 to 7 are significant and bit 10 is to be ignored. Bit 8=0 means that bits 0 to 7 are not significant and the control cell is either a read or write control cell, as indicated by the value of bit 10.

Bits 0–7 are used as an extension field, allowing for definition of several types of command control cells. In one embodiment of the invention, a single family of command control cells is defined, i.e., command control cells used for setting up connections (called GUCs). Bits 5–7 are used to define four GUC types (GUC 1 to GUC 4) while bits 1–4 are reserved. Bit 0=1 identifies a connection set-up command while bit 0=0 identifies a connection release command. Of course, the same bits can be used to define other types of command control cells.

The command field 808 (W4–W6) can be used for data which accompanies the control cell (either read, write or command). As an example, in the case of a read control cell (GRC), W4 can carry the identification of the hardware module register or storage position to be read while the data recovered from the storage location is placed in W5. In the case of a write control cell, W4 would identify the hardware module register or storage position to be written while W5 would contain the data to be written.

A reserved field 810 (W7–14) is not presently used.

The above encoding allows a control cell to be directed to more than one hardware module (any or all of Bits 11–15 can be concurrently set to 1). For instance, enabling a port on a high speed adapter 102 is done with a single control cell, which is a control cell with bit 10=0, bit 8=0, bit 13=1, bit 14=1 and bit 15=1.

Another example is provided with respect to control cells destined for ATM layer processing systems 116, 126, 158, or 160. Such control cells are used by the control processor 150 to update look-up and routing tables in the system's hardware at connection set-up and connection release. The cells contain macros that can be interpreted by the ATM layer processing modules or by any ATM processor. As an example, a type 1 GUC associates an internal system connection identifier —LCBA— to Virtual Path Identifier/ Virtual Channel Identifier (VPI/VCI) values in an incoming ATM label while a type 4 GUC associates an outgoing ATM label to an internal system connection identifier.

Referring back to FIG. 2, a control cell, as defined above, is processed on each of the identified paths in accordance with the following.

Path 170: The control cell is stored with W0 identifying the target adapter or blade (TB in target adapter field 816) and the connection control block address (LCBA in connection identification field 814) of '000h'. W1 contains, in cell type field 802, the code '100'. W2 contains a correlator. W3 contains the command type and the addressed hardware module. W4–W6 contain the command itself.

Path 172: The control cell is forwarded by ATM layer processing system 154 towards ATM layer processing system 158 which receives the content of W1 halfword low and W2. ATM layer processing system 158 identifies the cell as a control cell from the '100' code in the cell type field 802. Hence it ignores the content of W2 which contains a correlator used by control processor 150. In the processing of a user cell, ATM layer processing system 158 would perform a look-up using the ATM label contained in the ATM cell header to find out the address of the connection control block LCBA and the target blade TB to which the cell is to be directed. System 158 supplies system 154 with the information required to modify the cell W0 with TB and LCBA information. In the case of a control cell, this processing is bypassed since the control cell, prepared by control processor 150 already contains the TB and LCBA fields.

To determine whether the control cell, is destined for ATM layer processing system 158 or buffer system 154, system 158 analyzes the content of W3. In order to assure that this additional processing has no impact on the processing of the user cells. ATM layer processing, system 158 requests system 154 to queue the control cell in a low priority queue. The control cell is forwarded by buffer system 154 into a low priority process "1 strip" towards ATM layer processing system 158 which receives the content of W3 halfword low and W4–W6.

If the control cell is intended to result in an action in ATM layer processing system 158 or in buffer system 154 (Bit 11 or 12=1, Bit 15=1, Bit 9=1), this action is performed either directly in ATM layer processing system 158 or, through an appropriate system 158 to system 154 feed, in buffer system 154. In any case, ATM layer processing system 158 feeds buffer system 154 with the information to transmit the control cell. as it is, i.e. without modifications as the control cell already contains the necessary TB and LCBA fields.

Path 176: The control cell is forwarded by buffer system 122 towards ATM layer processing system 126 which receives the content of W0 halfword low. ATM layer processing system 126 identifies the cell as a control cell by the '000h' value in connection identification field 814. To determine whether the control cell is destined for ATM layer processing system 126 or buffer system 122, the ATM layer processing system 126 needs to analyze the content of W3. To assure this additional processing has no impact on processing of the user data cells, ATM layer processing system 126 requests buffer system 122 to queue the control cell in a low priority queue, the 1 queue.

In the case of a user cell, the ATM layer processing system 126 would use the LCBA to find out the target port to which the ATM cell is to be transferred. In the case of a control cell, this processing is bypassed since the control cell is always transmitted through a bus 133 bridging demultiplexer 120 and multiplexer 110. The control cell is forwarded by buffer system 122, low priority '1 strip' towards ATM layer processing system 126 which receives the content of W3 halfword low and W4–W6. If the control cell is intended to cause an action in ATM layer processing system 126 or in buffer system 122 (Bit 11 or 12=1, Bit 14=1, Bit 9=0), action is performed either directly in ATM layer processing system 126 or, through an appropriate system 126 to system 122 feed, in buffer system 122. In any case, ATM layer processing system 126 feeds buffer system 122 with the information to transmit the control cell through output bus 134.

Path 179: The control cell is forwarded by buffer system 112 towards ATM layer processing system 116 which receives the content of W1 halfword low and W2. ATM layer processing system 116 identifies the cell as a control cell by means of the '100' code in cell type field 802. Hence system 116 ignores the content of W2 which contains a correlator used by control processor 150. To determine whether the control cell. is destined for ATM layer processing system 116 or buffer system 112, ATM layer processing system 116 needs to analyze the content of W3. ATM layer processing system 116 requests buffer system 112 to queue the control cell. in the low priority 1 queue. The control cell is forwarded by buffer system 112 toward ATM layer processing system 116 which receives the content of W3 halfword low and W4–W6. If the cell is intended to result in action in ATM layer processing system 116 or buffer system 112 (Bit 11 or 12=1, Bit 15=1, Bit 9=0), this action is performed either directly in system 116 or after an appropriate system 116 to system 112 feed, in buffer system 112. In any case, ATM layer processing system 116 supplies buffer system 112 with the information to modify the control cell with the information 'TB=control element 151'.

Path 182: The control cell is forwarded by Buffer system 156 towards ATM layer processing system 160 which receives the content of W0 halfword low. ATM layer processing system 160 identifies the control cell by the '000h' value for LCBA in connection identification field 814. To determine whether the control cell is destined for ATM layer processing system 160 or Buffer system 156, ATM layer processing system 160 analyze the content of W3. To avoid any impact on processing of user cells, ATM layer processing system 160 requests Buffer system 156 to queue the control cell in the low priority 1 queue. In the case of a user cell, ATM layer processing system 160 uses the LCBA to find out the target port on which the cell is to be transmitted. In the case of a control cell., this processing is bypassed. The control cell is forwarded by Buffer system 156 in low priority process '1 strip' towards ATM layer processing system 160 which receives the content of W3 halfword low and W4–W6. If action is to be performed in system 160 or in buffer system 156 (Bits 11 or 12=1, Bit 14=1, Bit 9=1), this action is performed either directly in system 160 or, after an appropriate system 160 to system 156 feed, in buffer system 156.

Figure 6:
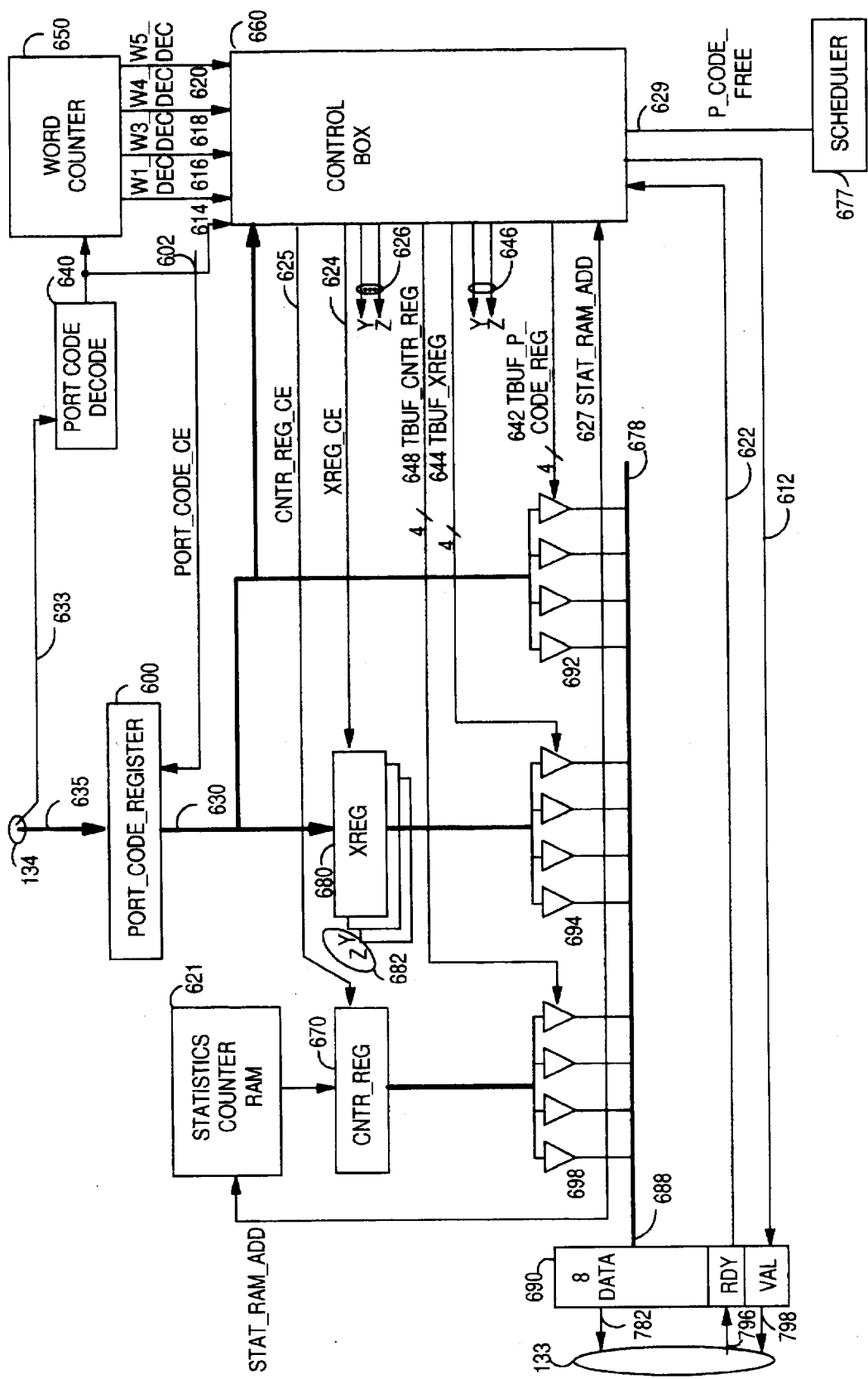
FIG. 6 provides details about the hardware mechanisms in demultiplexer system 120 to handle reading and writing of control cells.

Hardware mechanisms implemented in demultiplexer 120 are described below with reference to FIG. 6. The control cell is received in the demultiplexer 120 through output bus 134. The latter is composed of a one-byte wide data path 635 and a control path 633. A system port code/decode 640 on the control path 633 decodes the id of the port code 'F' associated with the valid word tag on and asserts a line port_code_ce (clock) on line 602 to enable a port code register 600. Line 602 also provides an input to the word counter system 650. The word counter is incremented each time line 602 is asserted and wraps at value '14'. Line 602 is also an input to the control box 660. If the received word is the second word (W1) in a cell, the word counter system 650 asserts the line 614. If the word is the fourth word, the line 616 is asserted. In the case of the fifth word, line 618 is asserted. In the case of the sixth word, line 620 is asserted.

Case 1: If none of these four lines are asserted when line 602 is asserted, the control system 660 waits the assertion of a ready_tag 622 issued from the demultiplexer up on the bus 133 and asserts the MSB bit of the four bits bus Tbuf_P_code_reg 642 to tbuf on the M bus long line the MSB byte of the received word and to load it into the data part of the M bus register 690. At the same time, the control system 660 asserts the valid tag 612 and loads it in the M bus register 690. The same process is repeated three additional times for the transfer of the three other bytes of the received word. Once this is done, the control_system 660 asserts the P_code_free line 629 to signal the scheduler 677 that a new request for the transmission of a word of port code 'F' can be issued to the output buffer, Case 2: If the line 614 is asserted, the control system searches the received cell for a type three bit pattern. If the pattern matches the control cell type '100', then the control system sets the Control_mode. If the Control_mode is not set, when fourth, fifth and sixth words are received, outputs from lines 616, 618, and 620 will be ignored in the control system 660, and these words will be processed as indicated for Case 1.

Case 3: If the line 616 is asserted and the Control_mode is set in the control system 660, the control system searches in the received W630 to determine if the control cell is a GRC or a GWC addressed to the high speed demultiplexer. In this case, the control system remains in Control_mode and sets either the GRC or GWC modifier while in the opposite case, the control system resets the Control_mode. The received W630 is transferred as described in Case 1.

Case 4: If the line 618 is asserted and the Control_mode is set in the control system 660, the control system searches in the received W630 for the address of the target entity which can be a register, Xreg 680, Y . . . Z registers 682 or a position in the statistics counter RAM 621. In the latter case, the control system 660 translates the address contained in the control cell into a stat_ram_add 627 and loads the result of the read operation into the Cntr_reg 670 by asserting the clock enable Cntr_reg_ce 625. The received W630 is transferred as described in Case 1.

Case 5a. If the line 620 is asserted and the Control_mode is set in the control system 660 and the GRC modifier is on, and the addressed entity was the statistics counter RAM 621, the control system transfers the value of the Cntr_reg 670 on the M bus 133. This is achieved by asserting successively the four Tbuf_Cntr_reg lines 648.

Case 5b. If the line 620 is asserted and the Control_mode is set in the control system 660 and the GRC modifier is on, and the addressed entity was a register say Xreg, resp (Yreg . . . Zreg), the control system transfers the value of the Xreg 680 (resp Yreg . . . Zreg 682) on the Mbus 133. This is achieved by asserting successively the four Tbuf_Xreg lines 644 (resp 646).

Case 5c. If the line 620 is asserted and the Control_mode is set in the control system 660 and the GWC modifier is on, the addressed entity is a register say Xreg (resp Yreg . . . Zreg) as there are no writes in the statistics counter RAM 621. The control system 660 asserts the appropriate clock enable line say Xreg_ce 624 (resp 626) in order to load the received W630 into the Xreg 680 (resp Yreg . . . Zreg 682) and transfers the value of the received W630 on the M bus 133 by asserting successively the four Tbuf_P_code_reg lines 642 (as described in Case 1) so that the word transferred is the word that was to be written in the addressed register.

Figure 7:
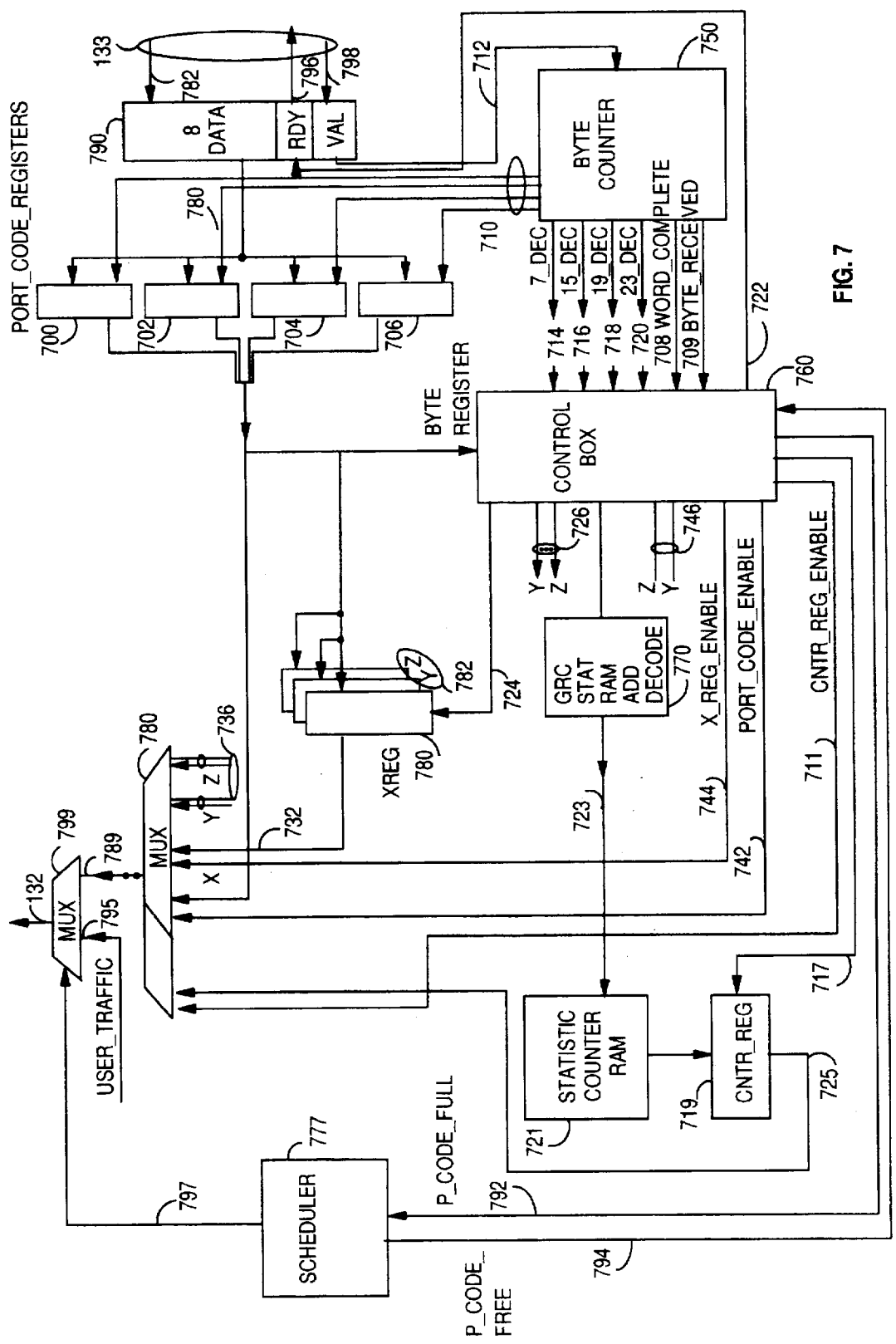
FIG. 7 provides details about the hardware mechanisms in multiplexer system 110 to handle reading and writing of control cells.

Hardware mechanisms implemented in multiplexer 110 are described below with reference to FIG. 7. The control cell is received in the multiplexer 110 on the M bus 133. The M bus is composed of a byte-width data bus 782 from demultiplexer to multiplexer and of two control tags, a ready tag 796 from multiplexer to the demultiplexer, a valid tag 798 from demultiplexer to multiplexer. Element 790 includes ten latches that interface the bus. The demultiplexer can put a new data byte on the bus and validate it by the valid tag only when the ready tag is asserted by the multiplexer. In the multiplexer, the valid tag out of the interface register 790, is received by the byte counter 750. The byte counter asserts the appropriate clock enable line 710 to load the content of the data part of register 790 into one of the four byte-port-code-registers 700, 702, 704, 706. Each time a byte is received, the byte counter system 750 asserts the byte_received line 709 towards the control system 760.

In addition, when the byte received is a word boundary (four bytes), the byte counter system 750 asserts the word complete line 708 towards the control system 760. The byte counter is incremented each time a valid word is received and wraps at value '59'. If the received byte is not a word boundary, the control system 760 asserts the ready line 722 towards the bus registers interface 790, allowing a new byte transfer from the demultiplexer. When the received byte is a word boundary, a word of the control cell is assembled in the four byte-port-code-registers 700, 702, 704, and 706. In the case the assembled word is the second word (W1, as word ranges from W0 to W14), the byte counter system 750 asserts the line 714; in the case it is the fourth word, the line 716 is asserted; in the case it is the fifth word, the line 718 is asserted; in the case it is the sixth word, the line 720 is asserted.

Case 1. If none of these four lines are asserted when word complete 708 is asserted, the control system 760 asserts line 792 which means that a word is ready to be transferred to the buffer system 112 on the bus 132 and asserts the line 742 so that the multiplexer output 789 takes the value of the received W730. Multiplexing 799 of the control cell traffic 789 from the M bus 133 and of the user control cell traffic 795 from the physical ports is managed by the scheduler 777 by the line 797. Once the word is transferred to the buffer system 112, the scheduler 777 asserts the line port_code_free 794. When receiving it, the control system 760 initiates a new byte transfer on the M bus by asserting the ready tag 722.

Case 2. If the line 714 is asserted, the control system searches for the type three bit pattern in the received W730. If the pattern matches the control cell type '100', then the control system sets the Control_mode. If the Control_mode is not set, when fourth, fifth and sixth words are received, lines 716, 718, 720 will be ignored in the control system 760. These words will be processed as described in Case 1.

Case 3. If the line 716 is asserted and the Control_mode is set in the control system 760, the control system searches the received W730 to determine if the control cell is a GRC or a GWC addressed to the high speed multiplexer. In this case, the control system remains in Control_mode and sets either the GRC or GWC modifier while in the opposite case, the control system resets the Control_mode. The received W730 is transferred as described in Case 1.

Case 4. If the line 718 is asserted and the Control_mode is set in the control system 760, the control system searches the received W730 for the address of the target entity, which can be a register, Xreg 780, Y . . . Z registers 782 or a position in the statistical counter RAM. In the latter case, system 770 translates the content of register 730 into an address of the statistical RAM 723 and the control system 760 asserts the clock enable Cntr_reg_ce line 717 to load the result of the statistics counter RAM 721 read operation in the Cntr_reg 719. An example of the addressed registers can be the 'port-enable-register'. The received W730 is transferred as described in Case 1.

Case 5a. If the line 720 is asserted and the Control_mode is set in the control system 760 and the GRC modifier is on, and the addressed entity was the statistical RAM, the control system asserts the enable Cntr_reg_enable 711 so that the multiplexer output 789 takes the value of the Cntr_reg 719. The received W730 is transferred as described in Case 1.

Case 5b. If the line 720 is asserted and the Control_mode is set in the control system 760 and the GRC modifier is on, and the addressed entity is a register, say Xreg, resp (Yreg . . . Zreg), the control system asserts the appropriate line 744 (resp 746) so that the multiplexer output 789 takes the value of Xreg output 732 (resp Yreg . . . Zreg output 736) along with the P_code_full line 792 and waits for the P_code_free line assertion 794 to resume transfer on the M bus 133.

Case 5c. If the line 720 is asserted and the Control_mode is set in the control system 760 and the GWC modifier is on, the addressed entity is a register say Xreg (resp Yreg . . . Zreg) as there are no writes in the statistical RAM (a RAM position is reset after being read by a GRC). In that case, the control system 760 asserts the appropriate clock enable line, say Xreg_ce 724 (resp 726) in order to load the received W730 into the Xreg 780 (resp Yreg . . . Zreg 782) and asserts the P_code_full line 792 and the port_code_enable line 742 so that the word transferred (multiplexer output 789) is the word that was to be written in the addressed register.

As already been mentioned, control cells allow any module in any adapter or blade to pass information to the centralized control processor 150, not by means of an interrupt, but rather by means of hardware generated control cells that uses the user data flow. To send information towards the control processor 150, a hardware module only needs to insert, into the data flow, a control cell having a format unique to control cells. In such a cell, cell type field 802 equals '100' and LCBA in connection identification field 814 equals '000h' in which command type field 812 specifies that the cell is a control cell. (GRC) with the bits being set appropriately to identify the module, the flow direction (up/down) and the adapter position. For example, the command type field 812 of a control cell generated by the output ATM layer processor of a high speed adapter 102 would be '0000 0000 0011 0010' (Bit 0 to Bit 15).

For the Control processor 150 to be able to distinguish between a GRC received in response to a GRC that it previously issued and a GRC generated by a hardware module, a dedicated correlator in W2 is reserved for the hardware to control processor 150 control cell flow. Similarly, as in the case of a GRC generated by the control processor 150, the GRC generated by the hardware module contains in W4 the address of the register or RAM whose data is written in W5.

Once generated, a control cell generated by a hardware module is similar to a control cell generated by the Control processor 150 and hence circulates towards the control processor 150. Since the control cell has the format of a GRC control cell addressed to the hardware module that generated it, it will be ignored by other modules as it circulates towards the control processor 150.

While there has been described what is considered to be a preferred embodiment of the invention, variations and modifications in that embodiment will occur to those skilled in the art once they become aware of the inventive concepts. Therefore, it is intended that the appended claims shall be construed to include both the preferred embodiment and all such variations and modifications as fall within the true spirit and scope of the invention.

What is claimed is:

1. A data switch for switching fixed length cells comprising:

a) a switching fabric having multiple inputs and multiple outputs, said switching fabric being capable of switching a fixed length cell received on any of the multiple inputs to any of the multiple outputs;

b) one or more input/output adapters, each connected to said switching fabric through at least one input and one output, each said adapter receiving data cells on one set of ports from a source external to the data switch for transfer to the switching fabric on internal cell paths and transmitting data cells received from said switching fabric on internal cell paths to another set of ports for transfer to a destination external to the data switch, each said adapter including one or more hardware modules for controlling the processing of data cells; and c) a control element connected to said switching fabric through at least one input and one output and including a control processor for generating control cells which can be directed to said hardware modules on said internal cell paths and through said switching fabric to allow the control processor to control the data switch operations, at least predetermined ones of said hardware modules further including a processor for generating control cells for transmission over said internal cell paths and through said switching fabric to an input of said control processor for use by said control processor in controlling data switch operations.

2. For use in fixed length cell switch having a multi-port switching fabric, one or more input/output adapters, each connected to said switching fabric through at least one input port and one output port, each said adapter receiving data cells on one set of switch input ports for transfer to the switching fabric over internal cell paths and transmitting data cells received from said switching fabric over internal cell paths to another set of switch output ports, each said adapter including one or more hardware modules for controlling the processing of data cells received on the switch input ports and data cells to be transmitted on the switch output ports and a control element connected to said switching fabric through at least one input port and one output port and including a control processor, a method of controlling the switch operation comprising the steps of:

a) generating control cells in said control processor, said control cells having the same length as data cells;

b) distributing the generated control cells from the control processor to predetermined hardware modules over the internal cell paths and through the switching fabric;

c) generating control cells in one or more of said hardware modules; and d) transferring the generated control cells from the originating hardware module to the control processor over the internal cell paths and through the switching fabric to provide control information to the control processor for its use in controlling the switch operation.

* * * * *